(No Model.)
J. F. RADERS.
NON-CENTRIFUGAL GOVERNOR AND SPEED INDICATOR.
No. 588,656. Patented Aug. 24, 1897.
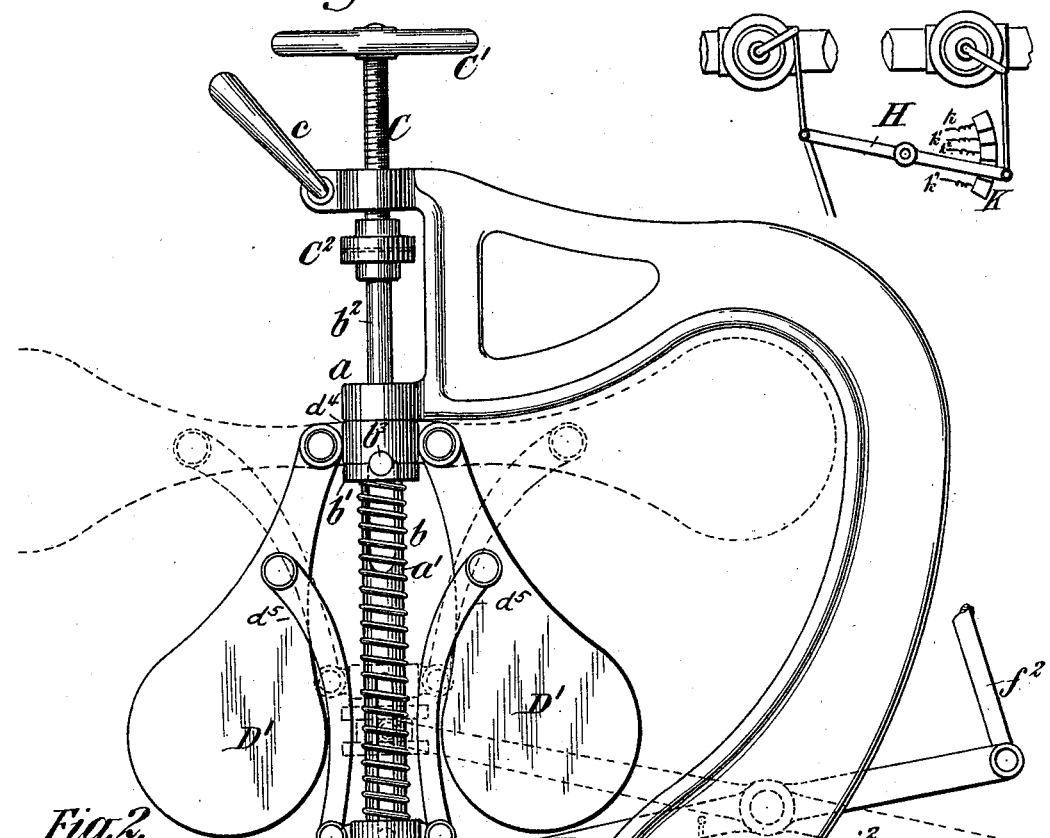
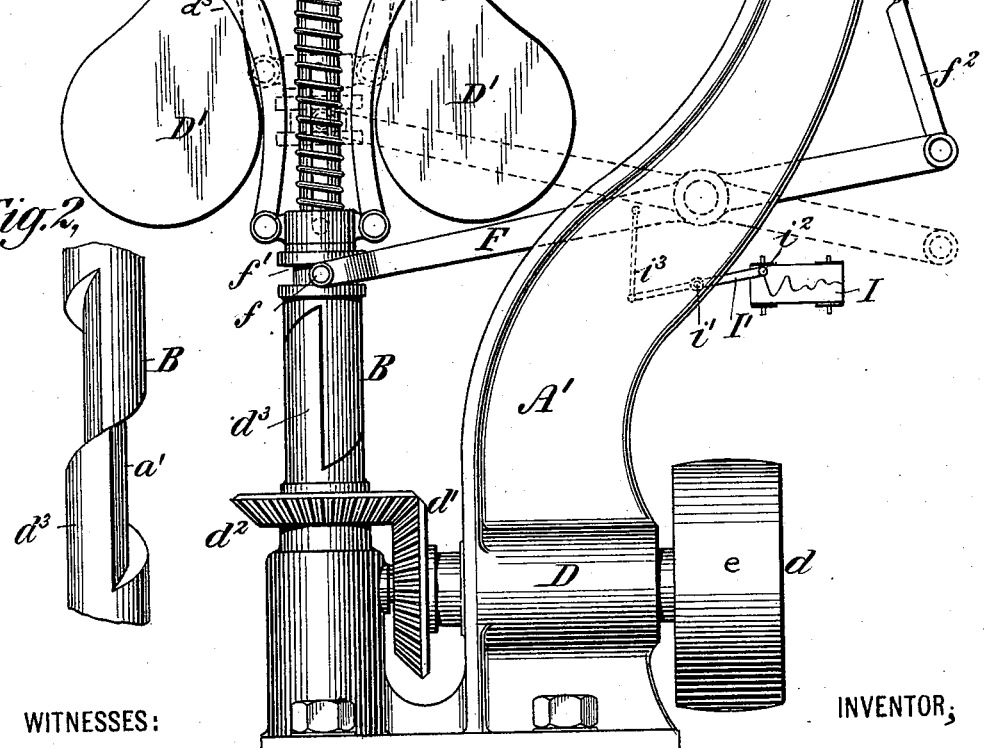
WITNESSES: INVENTOR;

UNITED STATES PATENT OFFICE.

JOSEPH F. RADERS, OF FLUSHING, NEW YORK, ASSIGNOR TO HIMSELF, AND EDWARD N. DICKERSON, OF NEW YORK, N. Y.

NON-CENTRIFUGAL GOVERNOR AND SPEED-INDICATOR.

SPECIFICATION forming part of Letters Patent No. 588,656, dated August 24, 1897.

Application filed January 22, 1897. Serial No. 620,269. (No model.)

*To all whom it may concern:*

Be it known that I, JOSEPH F. RADERS, of Flushing, New York, have invented a certain new and useful Improvement in Non-Centrifugal Governors and Speed-Indicators, of which the following is a specification.

Governors and regulating devices customarily employed for rendering the movement of steam-engines or other sources of power uniform partake of the movement of the source of power and are dependent for their actions upon centrifugal force, any variation in this latter force as developed usually in one or more rotating masses being utilized to increase or decrease the amount of motive fluid admitted. It is impossible with such centrifugal governors, from their very nature, to maintain a perfectly steady and uniform velocity, for it is necessary in order to secure an operation of the governor that there should be a sensible change in the speed of the governor and that this change should be fully accomplished, the governor acting only at the termination thereof. The degree of sensitiveness is further reduced by the consideration that the moving parts of the governor in their actions are subject to friction, thereby increasing the magnitude of speed necessary to cause the governor to act. All governors of this class in which there are revolving balls or their equivalent depend for their action upon a change in speed of revolution of the balls or equivalent parts. In the governor which is the subject of the present invention, however, in which I use a revolving fan having variable surface or resistance in place of the revolving balls, the governing action occurs without any necessary change in the speed of revolution of the fan. Theoretically the fan should continue to move with uniform velocity and the governing action should not disturb that speed of revolution. The present governor therefore differs from the previous type of governors in the fact that it is not necessary or desirable to change that speed of revolution of the revolving governing ball or fan, but the slightest difference in speed of revolution of the engine or the machine to be governed acts upon a moving part intermediate the engine and the governing revolving part, which movement itself performs the governing action. As will be seen in the study of the mechanism, the speed of revolution of the engine ultimately to be determined is dependent in the form shown upon two conditions, one of which is the tension of the spring upon the sleeve and the other of which is the resistance of the fans revolving at the determined speed. If either the tension of the spring or the size of the fan-blades or their inclination were changed, a resulting difference would be accomplished in the speed of the main engine.

The present invention is a modified form of certain of the parts shown and described in my application for patent, Serial No. 612,825, filed November 20, 1896, and consists of a separable driving-gear composed of two elements, a driving and driven member or part, each provided with a screw-like surface, which surfaces are in contact with each other, and rotating fans pivoted to the driven member.

The position of the driven element or part is controlled by the tension of a spring and the resistance of revolving fans. The result of the combination is that a constant increased motion (and when I say "increased" I refer likewise to decreased) will not be transmitted instantly or necessarily at all to the fans, for the action of the driving member upon the other member of the separable clutch under these conditions is a twofold one. It may either drive the latter member at a speed dependent upon the normal speed of the engine or if the motion be suddenly increased the driven member of the separable clutch is suddenly raised, owing to the sudden access in speed of the driving mechanism, which raising of the member does not, however, revolve the same, but compresses the governing-spring, and it is this function which I utilize in determining the speed of the governed engine. Of course, however, ultimately the increased speed of the engine, if not arrested by governing action, would communicate itself to the revolving fan. This would occur when the spring had resumed its normal tension with reference to the position of the driven member upon the shaft; but this tendency of increase in revolution, under these conditions, of the fan is counteracted in the fan itself, which is so constructed as to oppose an increasing resistance to any tendency to drive it faster or a decreased resistance to any tendency to drive it slower. Consequently the spring governing the position of the driven member would remain in a more compressed condition in driving the fan at the same rate of speed, the result of which would be to react upon the throttle-valve or governing portion of the mechanism, thereby closing the same and reducing the speed of the main engine. The contrary result of course, as will be readily seen, would be accomplished provided the fan was driven at a less velocity. In this case the extension of the governing-spring would be greater and the throttle-valve or governing portion would be opened. As will now be seen, therefore, my mechanism has within itself a double capacity of governing—in the first place a capacity of preventing or governing any sudden increase or decrease in speed in the machine without desirably changing the constant speed of revolution of the fan or revolving member, and in the second place my mechanism has a capacity of determining adjustably the constant speed at which the mechanism or driving-engine shall run, and it is likewise to be observed that this speed can be readily varied in the governor while the mechanism is in operation.

In the present drawings, which represent an embodiment of my invention, Figure 1 is a side elevation of the same. Fig. 2 is an enlarged view of a detail.

Similar letters of reference designate corresponding parts in both figures.

A designates a convenient bed-plate upon which the governor mechanism is mounted.

A' indicates an upright or standard extending from the base A, and here represented as extending forwardly at its upper part, where it is provided with a journal-bearing $a$ for an upright rotary shaft $a'$, whose lower extremity is journaled in the base-plate A or an appurtenance thereof.

B is a driven member of a separable driving-clutch having a screw-like surface fitted to the shaft $a'$ in a manner to be freely movable lengthwise of the latter, but which rotates therewith by means of an ordinary key or keyway construction. The member is urged to its lowermost position by a spring $b$, interposed between the upper extremity of the member and a collar $b'$, movable lengthwise of the shaft $a'$. The tension of the spring may be adjusted at will by means of a screw C and hand-wheel, the former entering a tapped hole in the upper portion of the upright A', movement being transferred from the extremity of the aforesaid adjusting-screw C to the collar $b'$ by means of a rod $b^2$, which enters the upper recessed extremity of the shaft $a'$ and is provided at its lower extremity with a cross-pin $b^3$, which passes through the transverse slot in the shaft $a'$ and bears upon the collar $b'$. Preferably a frictionless bearing $C^2$ will be provided at the upper extremity of the rod $b^2$. $c$ is a lever for clamping the screw C in any position to which it may be turned.

D is a bearing on the upright A' and in which there is journaled a shaft $d$, carrying a bevel-wheel $d'$, whose teeth engage with the bevel-wheel $d^2$. To this latter bevel-wheel there is secured a shell $d^3$, formed with a screw-like surface which is the counterpart of the corresponding surface on the member B and co-acts therewith. This shell $d^3$ forms the driving member of the clutch.

It is evident from the inclination of the pitch of the screw-like surfaces of the separable driving-clutch members that upon the forcible rotation of the member $d^3$ there is a tendency for the member B to move in two directions, rotarily upon its axis and lengthwise along the shaft $a'$, this latter movement being opposed by the yielding force of the spring $b$. Fans D' are provided for offering a resistance to the rotation of the member B. Now it is evident that for any given speed of rotation of the driving member there will be a certain position of the member B, dependent upon the resistance afforded by the spring $b$. If, however, the circumferential or angular speed of the driving member attempts to change, corresponding to a similar attempt on the part of the engine-shaft, &c., the member B will ascend or descend. To render the magnitude of this longitudinal movement of the member in exact proportion to the increase or decrease of the circumferential speed of the member $d^3$ above or below normal, I pivot the fans D' to a collar $d^4$, rigid with the shaft $a'$, and so connect them with the driven member that the position they are caused to assume is dependent upon the position of the driven member, they occupying a more nearly horizontal position as the member moves upward, and thus offering an increasing resistance to the rotation of the member. It is manifest from what has been said that any acceleration or retardation of the driving member will have a tendency to elevate the driven member or to permit the same to descend as well as to cause it to rotate more rapidly. By reason of the fact, however, that the fans rise in proportion as the driven member rises from a position in which they offer no or little resistance to rotation to positions in which this resistance is constantly increasing this latter tendency is nullified as to its effect and approximately the entire effort is expended in the elevation of the driven member. In other words, this governor may be distinguished from centrifugal governors in this, that in the present form the regulation is accomplished at the beginning of any retardation or acceleration in speed of the source of power, while with centrifugal governors regulation is effected only at the termination of a sensible amount of these variations.

The member B is connected with the fans D' by the links $d^5$. The shaft $d$ is journaled in the upright A' and provided with a pulley $e$, driven from the steam-engine or other source of power.

The amount of steam, compressed air, or other motive fluid admitted to the engine is under the direct control of the member B by means of a lever F, fulcrumed on a fixture of the upright A' or base-plate A and carrying at its outer extremity studs or pins $f$, which enter an annular groove $f'$, provided in the lower extremity of the member. The opposite extremity of the lever F may be connected by linkwork $f^2$ with the throttle-valve. (Not deemed necessary here to be shown.)

Of course a governor controlling the supply of steam or other motive fluid is effective only while admission is taking place, since an operation of the governor controlling the throttle will have no effect upon the engine, if such operation takes place during expansion, after the expansion-valve has been closed. In cases where the engine is of the condensing type—for instance, marine engines—the governor may be used to work not only the throttle-valve to vary the force urging the piston forward, but also a valve controlling the exhaust and thus effecting an increase or decrease in the resistance offered to the forward piston movement. For this purpose the link $f^2$ may be connected with a fulcrumed lever H, from which the condenser-controlling valve and throttle-valve may be worked. It is of course obvious that in the control of large engines an intermediate cylinder may be used to do the work of regulating the governor itself, merely serving to alter the position of a valve which controls the position of a piston in a cylinder which does the work. Such mechanisms are well-known. They are of a class in which the piston follows the movement of the valve. It is furthermore evident that since the member B is responsive to the speed of the source of power it may be utilized as a means for preserving a record of the speed of the engine. Means are shown in Fig. 1 by which this may be accomplished.

I indicates a paper record-strip driven by clockwork or otherwise.

I' is a lever fulcrumed intermediate of its ends at $i'$, to one extremity of which there is secured a suitable marker $i^2$, while its opposite extremity is mechanically connected with the lever F, as by a link $i^3$. The lever I' is moved therefore in correspondence to the movement of the lever F, and these changes in position are recorded on the paper strip or ribbon at I'.

The position of the driven member at any instant depending upon the speed at which the engine is running, it may be taken as indicating approximately the speed at which the vessel or locomotive is moving, and if the instrument is calibrated from the record it makes the distance traveled may be ascertained.

I have described the device thus far and referred to it as applicable to the control of the motive fluid admitted to a steam-engine or other source of power, but its use is not necessarily limited to such a purpose, as the principle embodied may be employed as a basis for the control of clockwork mechanism. For instance, the driving member $d^3$ may be driven direct from such mechanism, and the rise and fall of the driven member corresponding to an increase or decrease of the load upon the motor-shaft from which power is derived will serve to increase or decrease the resistance to rotation offered by the fans in inverse proportion to the varying load. Furthermore, as the tension on the driving-spring of the motor decreases the fans will gradually lower to compensate for the reduction in driving power, thus tending to maintain a uniform velocity.

The invention may also be applied to the control of an engine driving a dynamo-electric machine for rendering the output from such machine uniform, even though the engine is utilized to simultaneously drive additional variable load. For this purpose the movement of the lever F operates to throw in and out magnetizing coils or resistance, as shown in Fig. 1, where K represents a number of insulated contact-pieces in electrical communication with the wires $k$ $k'$ $k^2$ $k^3$, &c., in this instance by the lever H and a finger-piece carried and playing over these pieces. When the engine tends to slacken its speed due to an increase in the load thrown upon it, the lever F moves upon its pivot, throwing out one or more of the mentioned coils. At the same time the throttle will be opened to admit more steam or motive fluid until the engine acquires its normal speed, when these coils will be returned in circuit.

Having described my invention, what I consider as new, and desire to secure by Letters Patent, is—

1. The combination of a separable driving-clutch one of whose members is arranged to rotate and move lengthwise, pivoted fans, means connecting said fans with the lengthwise-movable element whereby the position of the fans is determined by the position of the element and means actuated by one member of the clutch for controlling the supply of motive fluid to the engine, substantially as specified.

2. The combination of a separable driving-clutch one of whose members is arranged to rotate and move lengthwise, a spring urging said element in one direction, pivoted fans, means connecting said fans with the element, whereby the position of said fans is determined by the position of the element and means actuated by one member of the clutch for controlling the supply of motive fluid to the engine, substantially as specified.

3. The combination of a separable driving-clutch one of whose members is arranged to rotate and move lengthwise, a spring urging the element in one direction, means for adjusting the tension of the spring, pivoted fans, means connecting said fans with the element, whereby the position of the fans is determined by the position of the element and means actuated by one member of the clutch for controlling the supply of motive fluid to the engine, substantially as specified.

4. The combination of a separable driving-clutch one of whose members is arranged to rotate and move lengthwise, and which is yieldingly held in position against the resistance of the other member, pivoted fans and links connecting said fans with the lengthwise-movable element whereby the position of the fans is determined by the position of the element and means actuated by one member of the clutch for controlling the supply of motive fluid to the engine, substantially as specified.

In testimony whereof I have signed my name to this specification in the presence of two subscribing witnesses.

JOSEPH F. RADERS.

Witnesses:
 PIERSON L. WELLS,
 CARROLL L. RIKER.